United States Patent
Han et al.

(10) Patent No.: US 6,678,431 B2
(45) Date of Patent: Jan. 13, 2004

(54) METHOD FOR COMPENSATING POLARIZATION MODE DISPERSION OCCURRING IN OPTICAL TRANSMISSION FIBER AND APPARATUS THEREFOR

(75) Inventors: Ki-ho Han, Busan (KR); Sang-soo Lee, Sungnam (KR)

(73) Assignee: Electronics and Telecommunications Research Institute, Daejon (KR)

(*) Notice: Subject to any disclaimer, the term of this patent is extended or adjusted under 35 U.S.C. 154(b) by 0 days.

(21) Appl. No.: 10/278,228

(22) Filed: Oct. 23, 2002

(65) Prior Publication Data
US 2003/0156776 A1 Aug. 21, 2003

(30) Foreign Application Priority Data
Feb. 21, 2002 (KR) .................................. 10-2002-9281

(51) Int. Cl.[7] .................................................. G02B 6/00
(52) U.S. Cl. ...................... 385/11; 385/27; 359/156; 359/161; 359/192
(58) Field of Search .............................. 385/11, 27, 15; 359/156, 158, 161, 192

(56) References Cited

U.S. PATENT DOCUMENTS

| | | | |
|---|---|---|---|
| 5,659,412 A | * 8/1997 | Hakki | ................. 359/156 |
| 5,930,414 A | 7/1999 | Fishman et al. | |
| 6,130,766 A | 10/2000 | Cao | |
| 6,417,948 B1 | * 7/2002 | Chowdhury et al. | ........ 359/161 |
| 6,493,473 B1 | * 12/2002 | Wooten | ................. 385/11 |
| 2001/0028760 A1 | * 10/2001 | Yaffe | .................. 385/27 |
| 2002/0015547 A1 | * 2/2002 | Patel | .................. 385/11 |

OTHER PUBLICATIONS

IEEE Photoonics Technology Leters, Vol, 9, No. 1, Jan. 1997, "Polarization Mode Dispersion Compensation by Phase Diversity Detection", B. Hakki, 3 pages.

* cited by examiner

Primary Examiner—Hemang Sanghavi
Assistant Examiner—Eric Wong
(74) Attorney, Agent, or Firm—Blakely, Sokoloff, Taylor & Zafman

(57) ABSTRACT

Method for compensating polarization mode dispersion, The method includes: transforming states and directions of polarization components of an optical signal received from the optical transmission line, rotating the polarization components of the optical signal output from the polarization controller, separating two orthogonal polarization components of the output from the polarization rotator so that a first polarization component is transmitted to an output path and a second polarization component is transmitted to a monitoring path, controlling the PC using a feedback control to minimize an electrical power filtered at a specified frequency so that the two orthogonal polarization components of the optical input signal to the polarization beam splitter are aligned to two axes of the PBS, and controlling the polarization rotator by comparing an optical power of the first polarization component transmitted to the output path with an optical power of the second polarization component transmitted to the monitoring path.

19 Claims, 13 Drawing Sheets

METHOD FOR COMPENSATING POLARIZATION MODE DISPERSION OCCURRING IN OPTICAL TRANSMISSION FIBER AND APPARATUS THEREFOR

BACKGROUND OF THE INVENTION

This application claims the priority of Korean Patent Application No. 2002-009281, filed Feb. 21, 2002, which is incorporated herein in its entirety by reference.

1. Field of the Invention

The present invention relates to a method for compensating polarization mode dispersion (PMD) occurring in optical transmission fiber in a high speed optical transmission system and an apparatus therefor.

2. Description of the Related Art

Recently, communication data has been rapidly increased due to an increase in a demand for Internet, and such a trend will be increased more in future. An optical transmission system with a wide bandwidth is required to accept a large capacity of data. In order to manufacture the optical transmission system, time division multiplexing (TDM) and wavelength division multiplexing (WDM) have been studied in a wider range. In TDM, as a bit rate increases, polarization mode dispersion (PMD) becomes influential.

In PMD, arbitrary birefringence is led to optical fiber on a transmission path due to internal causes such as an asymmetric optical fiber core structure and stress, and external causes like variations in an environment, such as variations in temperature, vibration, and pressure around a transmission path, thereby an optical signal by birefringence undergoes waveform distortion. The waveform distortion occurs due to a differential time delay of two polarization components perpendicular to each other commonly referred to as principal state of polarization (PSP) in transmission fiber. In this case, each PSP is transmitted without change of waveform. In a case where a time delay having a size same as the differential time delay of the two PSPs and having a reverse direction is forcibly applied to the two PSPs, the two PSPs are offset against each other, thereby distortion due to PMD is compensated. Several studies according to the principle are as below.

There is the article entitled "Polarization Mode Dispersion Compensation by Phase Diversity Detection", by B. W. Hakki, and published in IEEE Photonics Technology Letters, Vol. 9, No. 1, p 121–123, and the structure of a polarization mode dispersion (PMD) compensator 1500 that is proposed by B. W. Hakki and is referred to as prior art 1 is shown in FIG. 15. In the PMD compensator 1500, a polarization beam splitter 1530 optically separates two polarization components passing a transmission path, and a differential time delay is obtained from a mixer 1540, and a time delay having a size same as the differential time delay and having a reverse direction is electrically applied to the two polarization components, and the two polarization components are added by a combiner 1590, thereby a distorted signal is compensated. However, in the PMD compensator 1500, as a speed of a transmitted optical signal, that is, a bit rate, increases, a differential time delay should be calculated more precisely, and thus the mixer 1540 requires expensive high speed electronic devices. The physical length of the delay line 1570 is limited, resulting in restricting a compensation range, and mechanical movement is required for operation of the delay line 1570, and thus may make a bad effect on the reliability of a system.

A technique for compensating a differential time delay due to PMD by controlling an optical delay line and a polarization transformer in a Mach-Zehnder interferometer type PMD compensator by monitoring electrical spectrum is disclosed in U.S. Pat. No. 5,930,414 entitled "Method and Apparatus for Automatic Compensation of First-Order Polarization Mode Dispersion (PMD)", by Fishman et al., and published on Jul. 27, 1999. A compensator 1640 that is disclosed in U.S. Pat. No. 5,930,414 and is referred to as prior art 2 is shown in FIG. 16. In the compensator 1640, an optical signal output from a tap 1643 via a Mach-Zehnder interferometer 1642, passes through a photodetector 1646 and an amplifier 1645, and obtains an electrical power depending on a differential time delay. The control signal is applied to an automatic polarization transformer 1641 and an optical delay line 1642 using the electrical power as a feedback signal, the direction and size of PMD of the optical signal are controlled, and then the output of the optical signal is again monitored. As a result of this iterative process a compensated signal is eventually achieved. In the compensator 1640, an output signal of the amplifier 1645 passes a filter to a RF power detector included in a distortion analyzer 1644 and is integrated in a given frequency range so as to obtain an unambiguous feedback signal. However, the compensator 1640 employs a method for compensating PMD by a limited range of optical delay line, and thus, there is a limitation in a PMD compensation range, and the reliability of the system may degrade due to the use of the delay line that operates mechanically. An integrator is used to obtain an unambiguous signal, and thus an additional integration process is required. The control method of adjusting all possible polarization states with the automatic polarization transformer 1641 for each given differential time delay of the delay line 1642 may require relatively much time to obtain a final compensated signal.

In addition, the configuration of the above techniques is relatively complicated.

A technique for using only one polarization component between two principal states of polarization (PSPs) as a compensated signal is disclosed in U.S. Pat. No. 6,130,766 entitled "Polarization Mode Dispersion Compensation via an Automatic Tracking of Principal State of Polarization", by Cao et al., and published on Oct. 10, 2000. A compensator 1720 that is disclosed in U.S. Pat. No. 6,130,766 and is referred to as prior art 3 is shown in FIG. 17. In FIG. 17, an optical source 1712 at a transmission terminal 1710 is frequency modulated using a dithering input signal and a driver 1711. By controlling a polarization controller (PC) and tracking PSPs in a way that minimizes a second-order harmonic component of an interference signal between two PSPs that is detected from one output of a polarization beam splitter (PBS) 1725, axes of the two PSPs coincide with two axes of the PBS 1725, and therefore a undistorted compensation signal is obtained by selecting only one PSP between the two PSPs existing in the output of the PBS 1725. However, the above compensation method requires an additional apparatus such as a driver for frequency-modulating at a transmission terminal and additional manipulation. Moreover, a relatively complicated digital signal processing method using a DSP control unit 1722 is used. A smaller signal between the two PSPs may be selected as an output during PSP tracking, and thus, the reliability of the system cannot be guaranteed.

SUMMARY OF THE INVENTION

To solve the above problems, it is a first object of the present invention to provide a method for compensating polarization mode dispersion (PMD), in which there are no limitations on a PMD compensation range, and the reliability of a system can be guaranteed by allowing the optical power of a compensated output signal to be over half of input power, apparatus, and system therefor.

It is a second object of the present invention to provide a method for tracking principal state of polarization (PSP), in which a compensated signal is eventually achieved by iterative feedback control to minimize an electrical power at a certain specified frequency such as bit-rate frequency or its harmonics for NRZ format and twice the bit-rate frequency or its harmonics for RZ format.

It is a third object of the present invention to provide a method for compensating polarization mode dispersion (PMD), in which PMD can be compensated at a high speed by a simple optical structure and a simple signal processing method without requiring high-priced high speed electronic elements, apparatus, and system therefor.

Accordingly, to achieve the first, second, and third objects, according to one aspect of the present invention, there is provided an apparatus for compensating polarization mode dispersion (PMD) occurring in optical transmission fiber. The apparatus includes a polarization controller (PC) for transforming states and directions of polarization components of an optical signal received from the optical transmission line, a polarization rotator for rotating the polarization components of the optical signal output from the PC, a polarization beam splitter (PBS) for separating two orthogonal polarization components of the optical signal output from the polarization rotator, for transmitting a first polarization component to an signal output path and transmitting a second polarization component to a monitoring path, a compensation controller for controlling the PC using the electrical spectrum of the optical signal transmitted to the monitoring path so that the two orthogonal polarization components of the optical input signal to the PBS are aligned to two axes of the PBS, and a rotation controller for controlling the polarization rotator by comparing an optical power of the first polarization component transmitted to the signal output path with an optical power of the second polarization component transmitted to the monitoring path.

It is preferable that the optical signal transmitted to the monitoring path is detected by a photodetector to obtain its electrical spectrum.

It is also preferable that the compensation controller includes a comparing unit for comparing a presently detected electrical power filtered at the predetermined frequency satisfying the previously described principle of operation, with the previously detected one, and a feedback signal applying unit for applying a feedback signal to the PC so that the one having a smaller magnitude between the presently detected electrical signal and the previously detected electrical signal is selected as the result of comparison.

It is also preferable that the first polarization component and the second polarization component are measured by a first optical power meter and a second optical power meter, respectively.

It is also preferable that the rotation controller includes an optical power comparing unit for comparing a first optical power that is measured from the first optical power meter with a second optical power that is measured from the second optical power meter, and a rotation command applying unit for applying a 90 degree rotation command to the polarization rotator in a case where the first optical power is smaller than the second optical power as the result of comparison of the optical power comparing unit.

It is also preferable that the polarization rotator includes a faraday rotator.

In order to achieve the first, second, and third objects, according to another aspect of the present invention, there is provided an apparatus for compensating polarization mode dispersion (PMD) occurring in optical transmission fiber. The apparatus includes a polarization scrambler installed at a transmission terminal, for exciting polarization of input light to optical transmission fiber with equal probability in all directions and transmitting the scrambled light to an the transmission line, a polarization controller (PC) for transforming states and directions of polarization components of an optical signal received from the optical transmission line, a polarization beam splitter (PBS) for separating two orthogonal polarization components of the optical signal output from the PC, for transmitting a first polarization component to an signal output path and transmitting a second polarization component to a monitoring path, and a compensation controller for controlling the PC using the electrical spectrum of the optical signal transmitted to the monitoring path so that the two orthogonal polarization components of the optical input signal to the PBS are aligned to two axes of the PBS.

It is preferable that the optical signal transmitted to the monitoring path is detected by a photodetector to obtain its electrical spectrum.

It is also preferable that the compensation controller includes a comparing unit for comparing a presently detected electrical power filtered at the predetermined frequency satisfying the previously described principle of operation, with the previously detected one, and a feedback signal applying unit for applying a feedback signal to the PC so that the one having a smaller magnitude between the presently detected electrical signal and the previously detected electrical signal is selected as the result of comparison.

In order to achieve the first, second, and third objects, according to another aspect of the present invention, there is provided a method for compensating polarization mode dispersion (PMD) occurring in optical transmission fiber. The method comprises (a) transforming states and directions of polarization components of an optical signal received from the optical transmission line, (b) rotating the polarization components of the optical signal output from the PC, (c) separating two orthogonal polarization components of the optical signal output from the polarization rotator so that a first polarization component is transmitted to an signal output path and a second polarization component is transmitted to a monitoring path, (d) controlling the PC using the electrical spectrum of the optical signal transmitted to the monitoring path so that the two orthogonal polarization components of the optical input signal to the PBS are aligned to two axes of the PBS, and (e) controlling the polarization rotator by comparing an optical power of the first polarization component transmitted to the signal output path with an optical power of the second polarization component transmitted to the monitoring path.

It is preferable that step (d) comprises detecting the band-pass filtered electrical power at the predetermined frequency satisfying the previously described principle of operation, comparing a presently detected electrical power with the previously detected one, and applying a feedback signal to the PC so that the one having a smaller magnitude between the presently detected electrical signal and the previously detected electrical signal is selected as the result of comparison.

It is also preferable that step (e) comprises measuring optical powers of the first polarization component and the second polarization component, respectively, and comparing a first optical power of the first polarization component with a second optical power of the second polarization component, and applying a 90 degree rotation command to the polarization rotator in a case where the first optical power is smaller than the second optical power as the result of comparison.

In order to achieve the first, second, and third objects, according to another aspect of the present invention, there is provided a method for compensating polarization mode dispersion (PMD) occurring in optical transmission fiber. The method comprises (a) exciting polarization of input light to optical transmission fiber with equal probability in all directions and transmitting the scrambled light to the transmission line, (b) transforming states and directions of polarization components of an optical signal received from the optical transmission line, (c) separating two orthogonal polarization components of the optical signal output from the PC so that a first polarization component is transmitted to an signal output path and a second polarization component is transmitted to a monitoring path, and (d) controlling the PC using the electrical spectrum of the optical signal transmitted to the monitoring path so that the two orthogonal polarization components of the optical input signal to the PBS are aligned to two axes of the PBS.

It is preferable that step (d) comprises detecting the band-pass filtered electrical power at the predetermined frequency satisfying the previously described principle of operation, comparing a presently detected electrical power with the previously detected one, and applying a feedback signal to the PC so that the one having a smaller magnitude between the presently detected electrical signal and the previously detected electrical signal is selected as the result of comparison.

In order to achieve the first, second, and third objects, according to another aspect of the present invention, there is provided a method for compensating polarization mode dispersion (PMD) occurring in optical transmission fiber. The method comprises (a) transforming states and directions of polarization components of an optical signal received from the optical transmission line, (b) rotating the polarization components of the optical signal output from the PC, (c) separating two orthogonal polarization components of the optical signal output from the polarization rotator so that a first polarization component is transmitted to an output path and a second polarization component is transmitted to a monitoring path, (d) detecting the band-pass filtered electrical power at the predetermined frequency satisfying the previously described principle of operation, (e) controlling the PC so that the two orthogonal polarization components of the optical input signal to the PBS are aligned to two axes of the PBS until the detected electrical power is converged on a minimum value, and (f) controlling the polarization rotator so that a polarization component having a larger optical power between the first and second polarization components that are separated by the PBS is output, once the detected electrical power is converged on a minimum value.

In order to achieve the first, second, and third objects, according to another aspect of the present invention, there is provided a method for compensating polarization mode dispersion (PMD) occurring in optical transmission fiber. The method comprises (a) exciting polarization of input light to optical transmission fiber with equal probability in all directions and transmitting the scrambled light to the transmission line, (b) transforming states and directions of polarization components of an optical signal received from the optical transmission line, (c) separating two orthogonal polarization components of the optical signal output from the PC so that a first polarization component is transmitted to an output path and a second polarization component is transmitted to a monitoring path, (d) detecting the band-pass filtered electrical power at the predetermined frequency satisfying the previously described principle of operation, and (e) controlling the PC so that the two orthogonal polarization components of the optical input signal to the PBS are aligned to two axes of the PBS until the detected electrical power is converged on a minimum value.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

The present invention will be described more fully hereinafter with reference to the accompanying drawings in which preferred embodiments of the invention are shown.

Hereinafter, a first embodiment of the present invention will be described in detail with reference to FIGS. 1 through 9.

Figure 1:
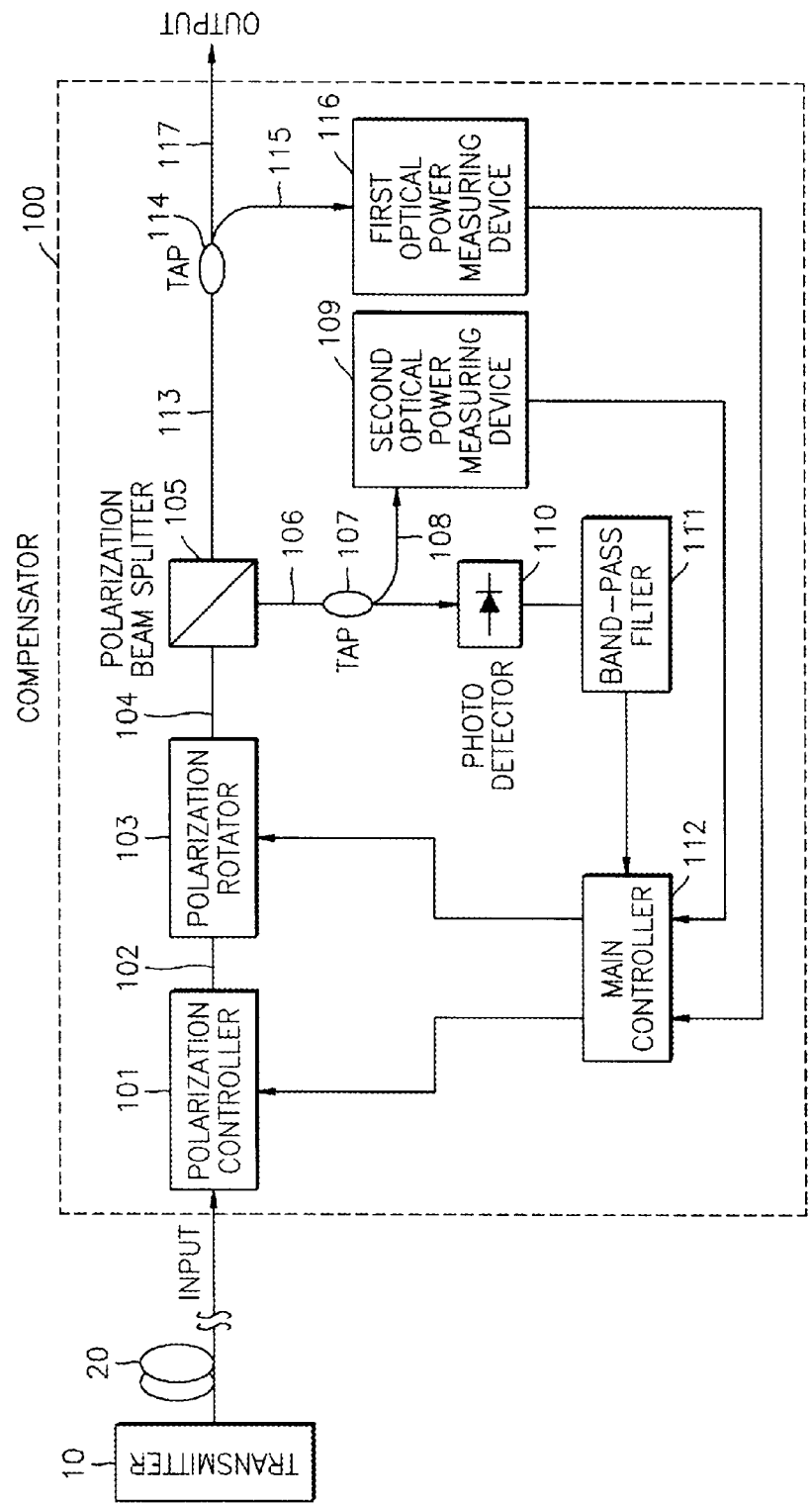
FIG. 1 is a schematic diagram of a polarization mode dispersion (PMD) compensator according to a first embodiment of the present invention.

FIG. 1 schematically illustrates the structure of a polarization mode dispersion (PMD) compensator according to a first embodiment of the present invention. An optical signal generated from a transmitter 10 undergoes polarization mode dispersion (PMD) while passing through an optical fiber transmission path 20, and the optical signal is input into a PMD compensator 100.

The optical signal which sequentially passes through a polarization controller (PC) 101 and a polarization rotator 103 such as a faraday rotator, of the compensator 100 is separated into two polarization components by a polarization beam splitter (PBS) 105.

The optical signal orienting to a monitoring path 106 between the separated two polarization components is divided into two different power components by an optical tap 107, and one component is converted into an electrical signal through a photodetector 110, is transferred to a band-pass filter 111, is filtered to a predetermined frequency component, and then is supplied to a main controller 112. The other component 108 separated form the optical tap 107 is input into a second optical power meter 109, and its measured value is transferred to the main controller 112.

The other polarization component that is separated by the PBS 105 and is transmitted to a signal output path 113 is also divided into two paths through the optical tap 114. One component facing a path 117, which is an output signal, gets out of the compensator 100, and the other component transmitted to a path 115 is input into a first optical power meter 116, and its measured value is transferred to the main controller 112.

Figure 2:
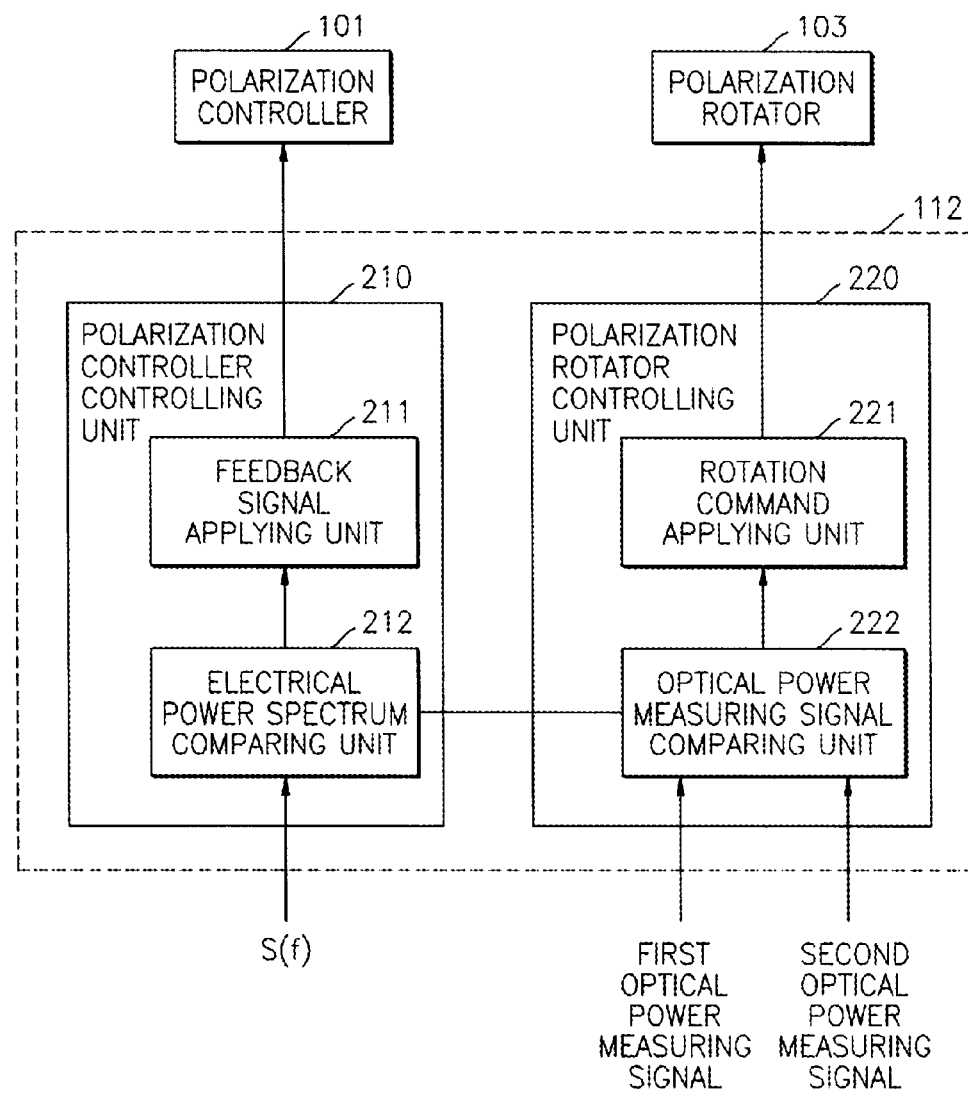
FIG. 2 illustrates the detailed structure of a main controller shown in FIG. 1.

The detailed structure of the main controller 112 shown in FIG. 1 is shown in FIG. 2. The main controller 112 includes a polarization controller controlling unit is 210 for controlling a polarization controller (PC) 101 and a polarization rotator controlling unit 220 for controlling a polarization rotator 103. The polarization controller controlling unit 210 includes a feedback signal applying portion 211 and an electrical power comparing unit 212. The electrical power comparing unit 212 receives electrical power from the band-pass filter 111, compares the present electrical power with the previously received one and deliver a command onto the feedback signal applying unit 211 according to the result of comparison. The feedback signal applying unit 211 applies a feedback signal to the PC 101 in response to received instruction. The polarization rotator controlling unit 220 includes a rotation command applying unit 221 and an optical power comparing unit 222. The optical power comparing unit 222 compares a first optical power signal supplied from the first optical power meter 116 with a second optical power signal supplied from the second optical power meter 109 and directs onto the rotation command applying unit 221 according to the result of comparison. The rotation command applying unit 221 applies a rotation command to the polarization rotator 103 in response to received instruction. In this way, the main controller 112 controls the PC 101 and the polarization rotator 103. The detailed principle of generating a control signal will be described below.

In the principle of operation of the compensator 100 shown in FIG. 1, two PSPs of the transmitted optical signal are separated by allowing their axes to coincide with two axes of the PBS 105 through a feedback step, and then the PSP having a larger power between the separated two PSPs is selected as a final output optical signal. Hereinafter, this principle of operation will be described with reference to FIGS. 3 through 9 in detail.

Figure 3:
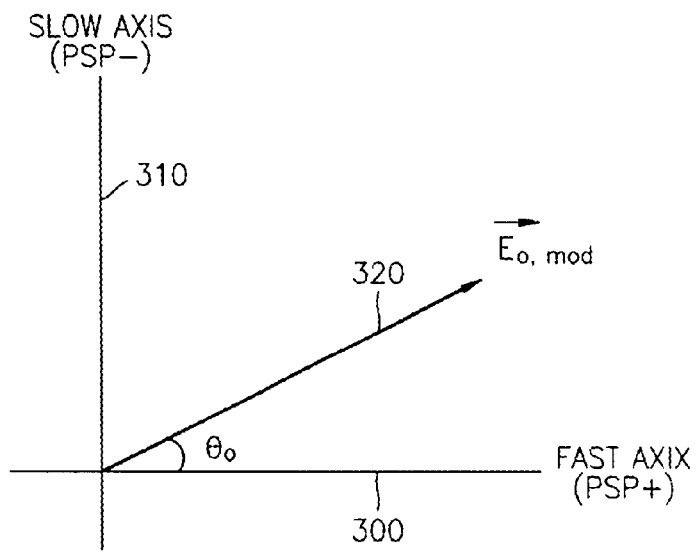
FIG. 3 illustrates a relation between polarization of input light entering transmission fiber and axes of principal states of polarization (PSP) of the fiber according to the first embodiment of the present invention.
Figure 4:
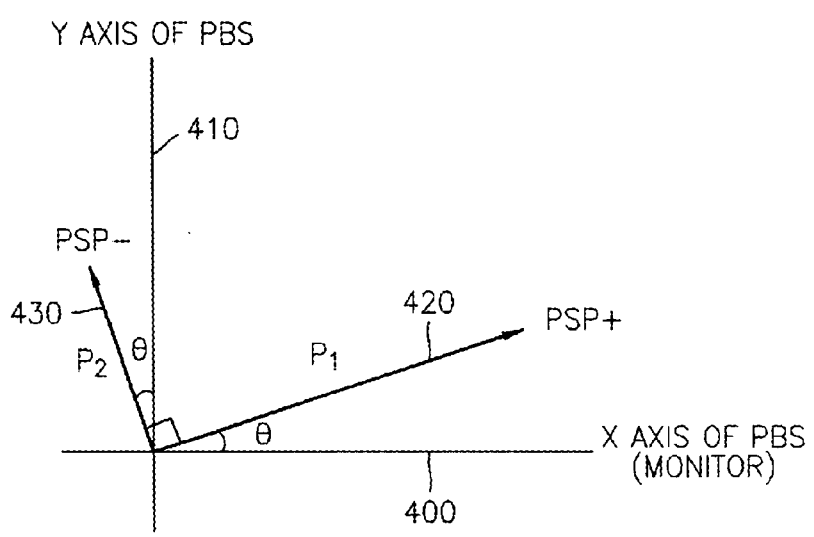
FIG. 4 illustrates a relation between axes of a polarization beam splitter (PBS) and two polarization components of PSP of the light input to the PBS according to the first embodiment of the present invention.

A monochromatic optical complex field of the form $$E_{in}(t) = \sqrt{I_o} e^{i\omega_o t} \quad (1)$$

with constant intensity $I_o$ and optical carrier angular frequency $\omega_o$, is assumed to be coupled into the Mach-Zehnder intensity modulator. When the modulator is driven with push-pull operation, the output field 320 from the modulator becomes $$E_{o,mod}(t) = E_{in}(t) \cos\frac{\Delta\phi}{2} \quad (2)$$

where $\Delta\phi$ is the phase difference between the optical waves propagating in the two waveguides of the modulator. The output field of the modulator 320 is launched into the birefringent transmission fiber with two principal states of polarization (PSP) and experiences differential group delay (DGD). In this case, the incident angle between the polarization of the signal and one axis of the two PSPs 300 and 310 is assumed to be $\theta_o$ as shown in FIG. 3. The transmitted field at the fiber output can then be expressed as the form $$\vec{E}_{o,fiber}(t) = \quad (3)$$
$$\hat{p}_+ \sqrt{\alpha I_o}\cos\theta_o\cos\frac{\Delta\phi(t+\tau)}{2}e^{i\omega_o(t+\tau)} + \hat{p}_- \sqrt{\alpha I_o}\sin\theta_o\cos\frac{\Delta\phi(t)}{2}e^{i\omega_o t}$$

where $\tau$ is the DGD between the two PSPS, $\alpha$ indicates fiber loss, and $\hat{p}_+$, $\hat{p}_-$ denote unit vectors in positive direction of the PSP+420 and PSP−430 axes, respectively. The output light of the transmission fiber is sent to a polarization beam splitter (PBS) that divides the input polarization into two x-400 and y-410 orthogonal polarization components of the PBS. When the signal light is incident on the PBS as shown in FIG. 4, the instantaneous intensity at the output path of the PBS x-axis can then be written as $$I(t) = \alpha I_o\left[\cos^2\theta_o\cos^2\theta\cos^2\frac{\Delta\phi(t+\tau)}{2} + \sin^2\theta_o\sin^2\theta\cos^2\frac{\Delta\phi(t)}{2} - \frac{1}{2}\sin2\theta_o\sin2\theta\cos\omega_o\tau\cos\frac{\Delta\phi(t+\tau)}{2}\cos\frac{\Delta\phi(t)}{2}\right] \quad (4)$$

where $\theta$ indicates the angle between the PSP+ component of the light and the PBS x-axis in FIG. 4. The Fourier transform of I(t) becomes $$q(\omega) = \alpha I_o[F(\omega)(a^2 e^{i\omega\tau} + b^2) - 2abH(\omega)\cos\omega_o\tau] \quad (5)$$

where $$F(\omega) = \int \cos^2\frac{\Delta\phi(t)}{2} e^{-i\omega t} dt$$

-continued $$H(\omega) = \int \cos\frac{\Delta\phi(t+\tau)}{2}\cos\frac{\Delta\phi(t)}{2}e^{-i\omega t}dt$$

$$a = \cos\theta_o\cos\theta, \quad b = \sin\theta_o\sin\theta, \quad \omega = 2\pi f.$$

Assuming detector responsivity of 1, the detected electrical power spectrum is then obtained as follows $$S(\omega)=|q(\omega)|^2=\alpha^2 I_o^2\{(a^4+b^4+2a^2b^2$$

$$\cos\omega\tau)|F(\omega)|^2+4a^2b^2|H(\omega)|^2\cos^2\omega_o\tau$$

$$-4ab\cos\omega_o\tau Re[(a^2e^{i\omega\tau}+b^2)F(\omega)H^*(\omega)]\} \quad (6)$$

In order to calculate Equation 6, an arbitrary NRZ data pulse signal is assumed to be f(t). T is a bit period, and a phase difference $\Delta\phi$ can be expressed as the form $\Delta\phi=\pi[1-f(t)]$. If integrated and calculated over a given time interval of [−7T, 7T] shown in FIG. 5 for a PMD value τ satisfying $0\leq\tau\leq T$, $F(\omega)$ and $H(\omega)$ of Equation 5 become $$F(\omega) = \quad (7)$$

$$\frac{-1}{i\omega}(e^{-i5\omega T}+e^{-i2\omega T}+e^{-i\omega T}+e^{-i5\omega T}-e^{-i3\omega T}e^{-i\omega T}e^{-i4\omega T}-e^{-i6\omega T})$$

$$H(\omega) = \frac{-1}{i\omega}[(e^{-i5\omega T}+e^{-i2\omega T}+e^{-i\omega T}+e^{-i5\omega T})\cdot e^{-i\omega T}e^{-i3\omega T}e^{-i\omega T} -$$

$$e^{-i4\omega T}-e^{-i6\omega T}]$$

If these values are substituted in Equation 6, an electrical power spectrum $Q(\omega)$ can be obtained.

Figure 6:
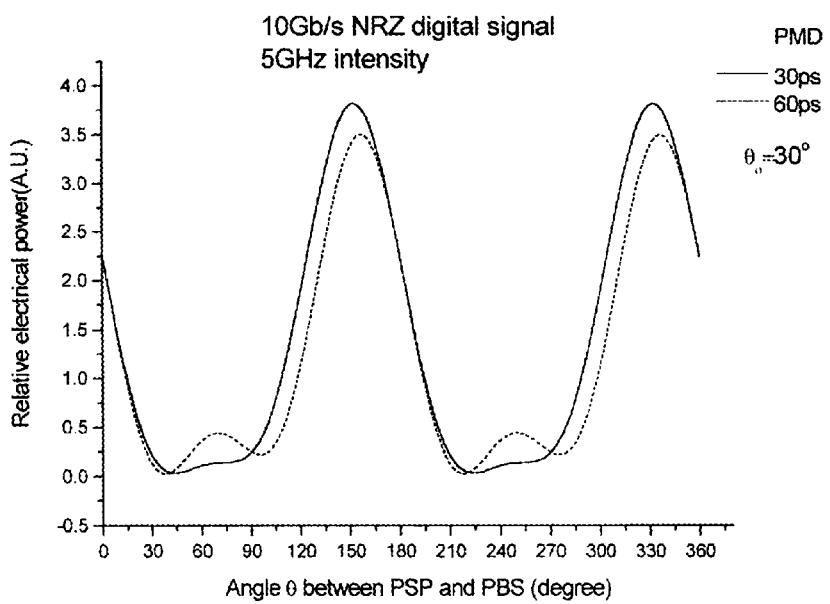
FIG. 6 is a graph illustrating change of relative electrical power at a given 5 GHz frequency with variations in an angle formed between the PBS and the PSP according to the first embodiment of the present invention.

FIG. 6 shows an electrical power at a given 5 GHz frequency with respect to an angle θ formed between the PSP+ and the PBS for a 10 Gb/s NRZ signal when PMD are 30 ps and 60 ps, respectively. Here, $\theta_o=\pi/6$, and θ are adjusted by the polarization controller 101 of FIG. 1. In order to track an undistorted and compensated signal, the electrical power should converge on a maximum or minimum value at $\theta=n\pi/2(n=0,1,2,\ldots)$. However, it can be seen from FIG. 6 that these conditions are not satisfied. That is, PSP tracking by means of the electrical power cannot be performed at a 5 GHz frequency. The same result is obtained at other frequencies except 10 GHz and its harmonic frequencies.

Figure 7:
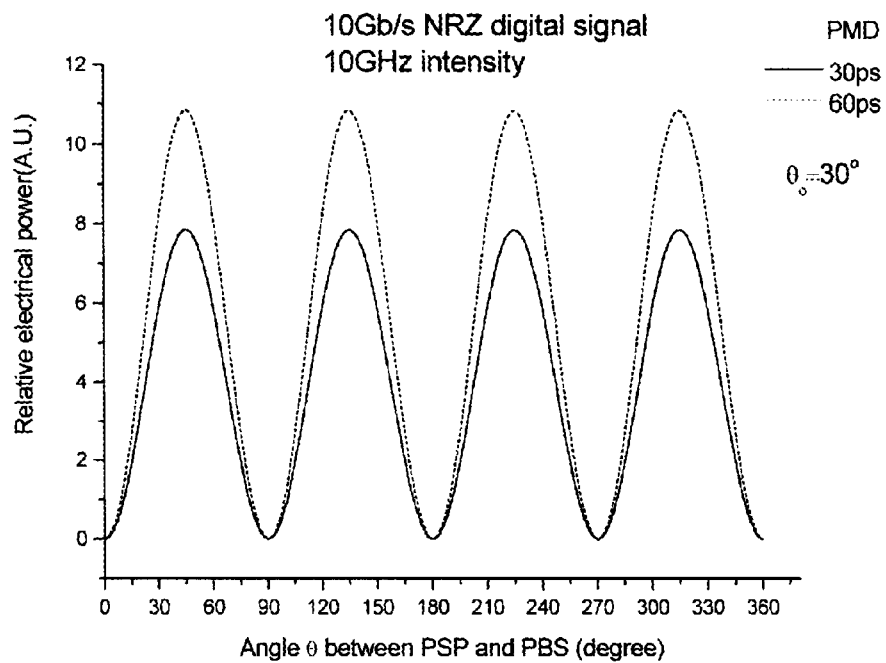
FIG. 7 is a graph illustrating change of relative electrical power at a given 10 GHz frequency with variations in an angle formed between the PBS and the PSP according to the first embodiment of the present invention.

On the other hand, FIG. 7 shows an electrical power at a given 10 GHz frequency with respect to θ, and the electrical power converges on a minimum value at $\theta=n\pi/2(n=0,1,2,\ldots)$. That is, this means that PSP can be tracked and a compensated pulse signal can be obtained by adjusting θ so that the value of the electrical power is converged on a minimum. Thus, PMD can be compensated by tracking the convergent minimum value of the electrical power at a 10 GHz frequency.

Figure 8:
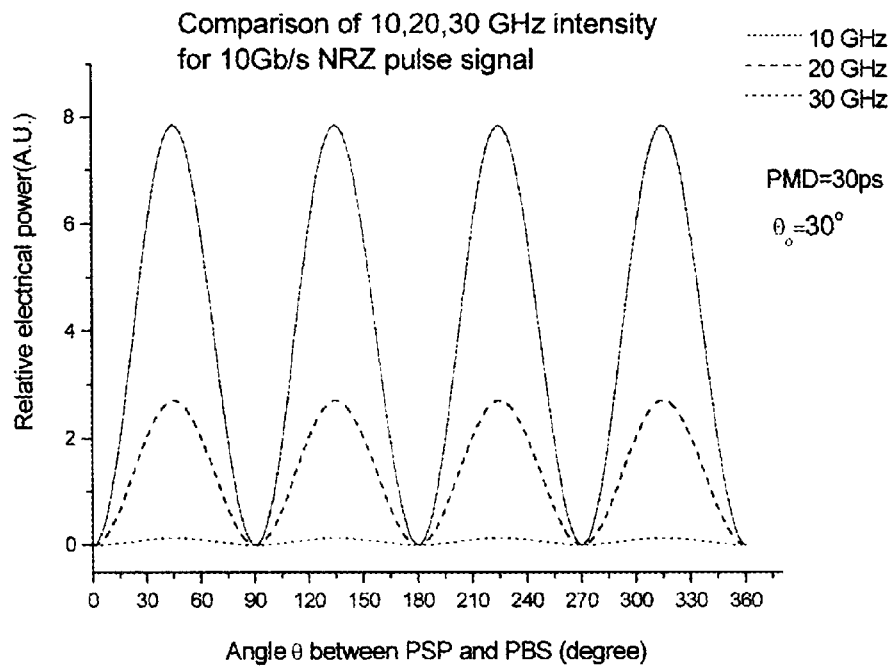
FIG. 8 is a graph illustrating comparison of electrical power changes at 10, 20, and 30 GHz frequencies with variations in an angle formed between the PBS and the PSP according to the first embodiment of the present invention.
Figure 9:
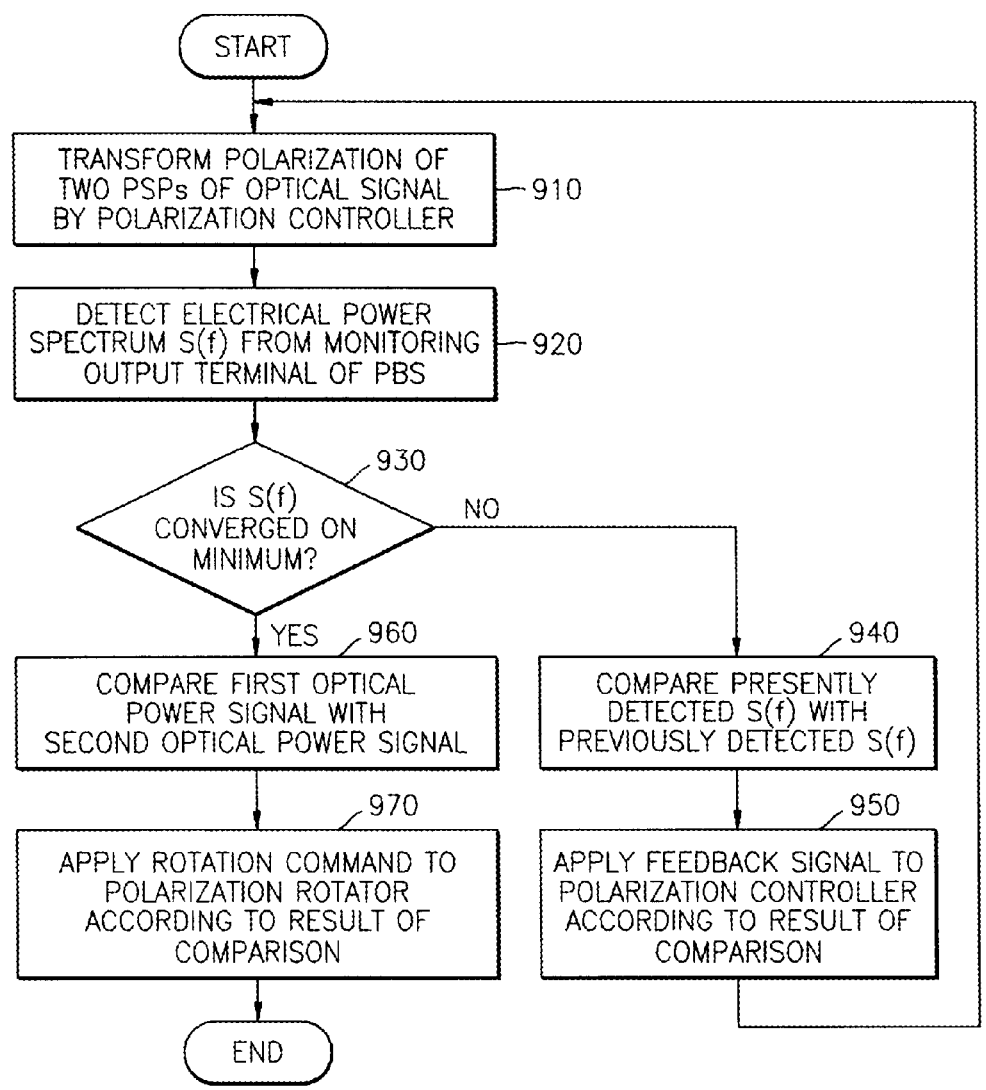
FIG. 9 is a flow chart illustrating step of compensating PMD by using the PMD compensator shown in FIG. 1.

FIG. 8 shows that PSP can be tracked at 10, 20, and 30 GHz frequencies. To sum up, this means that when a signal is a NRZ pulse signal having a time period T, a frequency that can be tracked is f=n/T (n=1,2,3, . . . ), and when the value of the electrical power is converged on a minimum value by adjusting θ at the frequency, θ is converged on one of the values $\theta=n\pi/2(n=0,1,2,\ldots)$, and this means that one of undistorted two PSP components is extracted and is adopted as a compensated signal.

The tracking method according to the present invention is very different from that of the prior art (U.S. Pat. No. 5,930,414). In a tracking method in the prior art, a compensated signal can be obtained by adjusting two variables θ and τ in such a way that the value of an electrical power is converged on a maximum value at a frequency excluding f=n/T (n=1,2,3, . . . ). A difference between the present invention and the prior art is that a frequency for tracking is different and a tracking method of feeding back so that the electrical power is converged on a maximum value is different. Furthermore, the adjustment of τ, that is, optical delay, as an adjustment variable for compensation is added besides the adjustment of θ, and thus a time required for compensation is much longer than that in the present invention.

Figure 5:
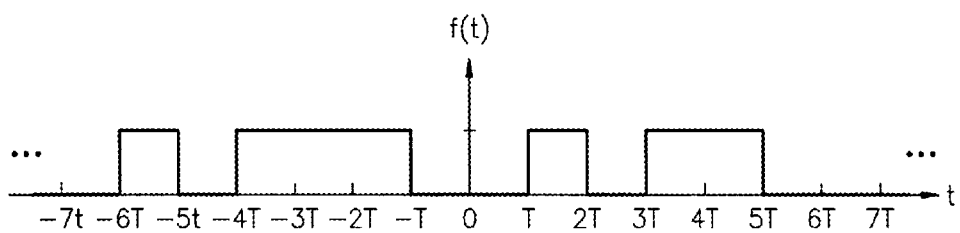
FIG. 5 shows a given random NRZ data format in time domain according to the first embodiment of the present invention.

Until now, the compensation principle for a specific pulse mode as shown in FIG. 5 has been described. Now, it will be described below that the above principle is applicable to an arbitrary pulse mode. In general, when a signal is a random NRZ pulse stream having a bit period T, an electrical power spectrum $S(\omega)$ that is detected by a photodetector is obtained as follows by $F(\omega)=0$ at a frequency f=n/T (n=1, 2,3, . . . ).

$$S(\omega) = \frac{\alpha^2 I_o^2}{4}\sin^2 2\theta_o \sin^2 2\theta \cdot |H(\omega)|^2 \cos^2\omega_o\tau \quad (8)$$

When $\theta_o$ and τ are set to fixed values, $S(\omega)$ is expressed as the function of θ as shown in FIG. 7, and this graph has a convergent minimum value at $\theta=n\pi/2(n=0,1,2,\ldots)$. Accordingly, even when a signal is an arbitrary NRZ pulse stream, it has been proved that the signal can be compensated by PSP tracking at the frequency f=n/T (n=1,2,3, . . . ). Meanwhile, when a data signal is an arbitrary RZ pulse stream having a bit period T and a pulse duration T/2, $F(\omega)=0$ at f=2n/T(n=1,2,3, . . . ) unlike the NRZ signal case and $S(\omega)$ is obtained as shown in Equation 8. Thus, for RZ signal case, by adjusting θ so that $S(\omega)$ at a frequency f=2n/T (n=1,2,3, . . . ) is converged on a minimum value, a compensated signal can be obtained, and the variable θ becomes one of the values of $\theta=n\pi/2(n=0,1,2,\ldots)$.

Hereinafter, the method for tracking PSPs of the transmitted optical signal will be described in further detail. In step 920, polarization transmitted to the monitoring path 106 passes through the tap 107 and photodetector 110 that converts the optical signal into electrical signal and thus obtain an electrical power spectrum S(f). The electrically converted signal passes through the band-pass filter 111 and the filtered signal is input into the main controller 112. In step 940, the electrical power spectrum comparing unit 212 of the main controller 112 compares the presently detected S(f) with the previously detected S(f). In step 950, the electrical power spectrum comparing unit 212 directs onto the feedback signal applying unit 211, which controls PC, such that the smaller value of the two detected S(f) s is selected. This process is repeated until S(f) is converged on a minimum value by step 930. In a case where measured S(f) is larger than the previously detected S(f) as a result of comparison of the electrical power spectrum comparing unit 212, the feedback signal applying unit 211 applies a feedback signal to the PC in a direction reverse to that of a feedback signal applied previously. In a case where measured S(f) is smaller than the previously detected S(f) as a result of comparison of the electrical power spectrum comparing unit 212, the feedback signal applying unit 211 applies a feedback signal to the PC in the same direction as that of the feedback signal applied previously.

In this case, the PC adjusts the state and direction of PSPs of the optical signal in response to the received feedback signal.

In a case where a feedback step is repeated in this way, S(f) is eventually converged on a minimum value. Of course, this convergence may be judged by the electrical power spectrum comparing unit 212. In this case, θ is also converged on one of the values θ=nπ/2, (n=0, 1, 2, . . . ). This means that two orthogonal components of the PSPs are aligned to two axes of the PBS.

In a case where θ is converged on 0°, as shown in FIG. 4, the PSP+420 of the PBS x-axis, which is the monitoring path, has an optical power of $P_1$, and the size of an output signal PSP−430 transmitted to the y-axis path is $P_2$. In such a case, a problem occurs when $P_2$ is smaller than $P_1$. In a case where $P_2$ is too small, the signal may disappear.

In order to solve these problems, once S(f) is converged on a minimum value, the main controller reads the size of each PSP, which is transmitted to two paths of the PBS, from the first optical power meter 116 and the second optical power meter 109 shown in FIG. 1. In step 960, the optical power comparing unit 222 compares the received two signals with each other. In a case where the size of an output signal (the first optical power output from the first optical power meter 116) is smaller than a monitoring signal (the second optical power output from the second optical power meter 109), a control signal is transmitted to the rotation command applying unit 221, and the rotation command applying unit 221 applies a rotation command such that input light polarization entering the PBS is rotated by π/2 by the polarization rotator 103 in step 970. Thus, PSP having a larger size between the two PSPs is always selected as a compensated final optical signal, and thus, its power is always over half of input power of the PBS. Furthermore, since amplified spontaneous emission (ASE) noise is reduced by the PBS to half of the ASE noise input to the PBS, output optical signal-to-noise ratio (OSNR) is increased by an amount of up to 3 dB more than input OSNR, thus improving the system performance.

Hereinafter, a second embodiment of the present invention will be described s with reference to FIGS. 10 through 14 in detail.

Figure 10:
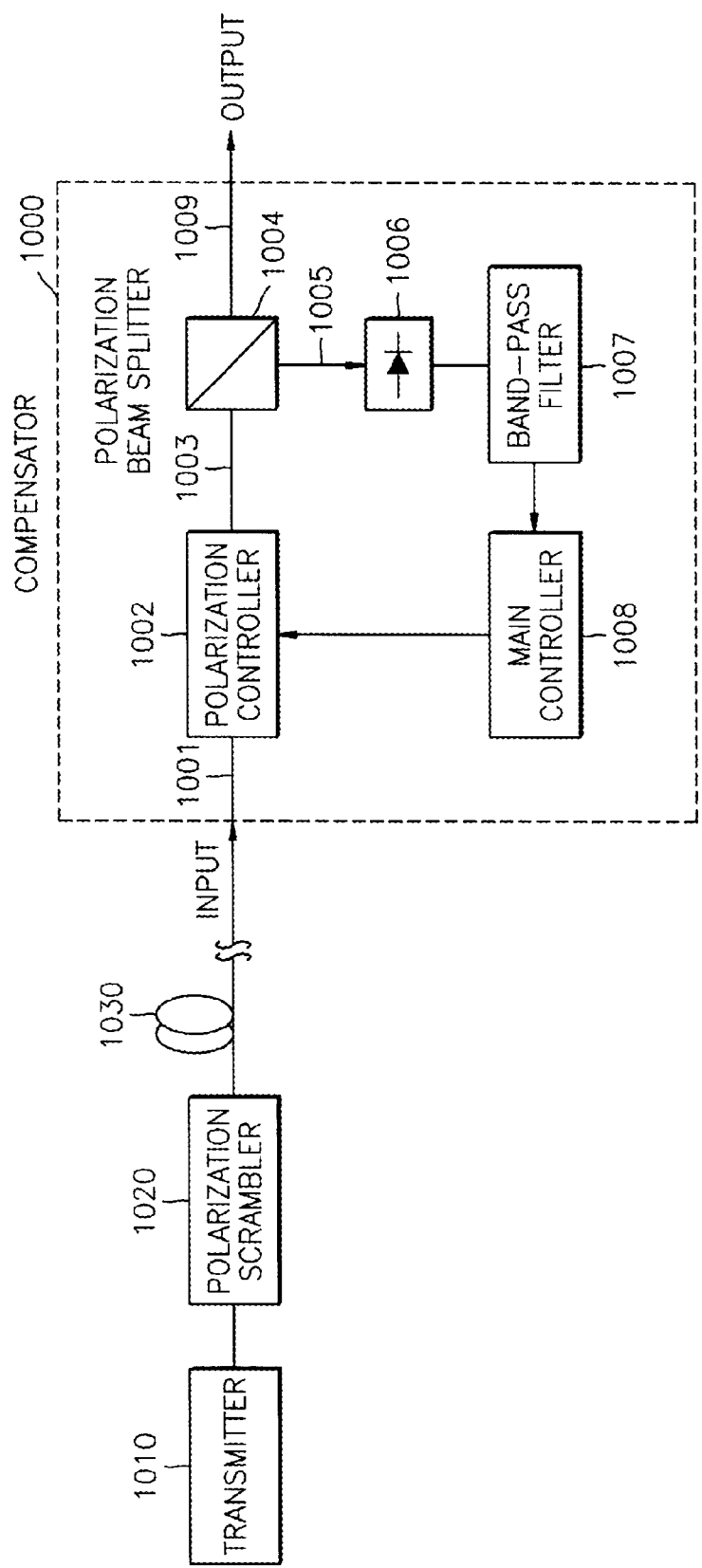
FIG. 10 is a schematic diagram of a polarization mode dispersion (PMD) compensator according to a second embodiment of the present invention.
Figure 11:
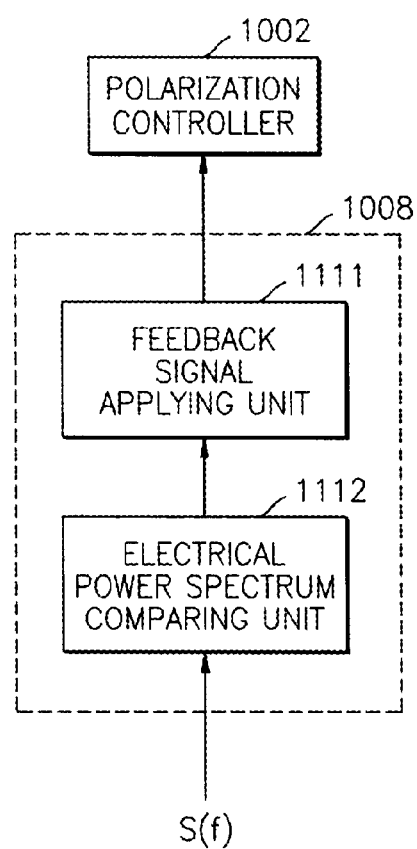
FIG. 11 illustrates the detailed structure of a main controller shown in FIG. 10.

FIG. 10 illustrates a polarization mode dispersion compensator using a high speed polarization scrambler 1020 between a transmitter 1010 and optical transmission fiber 1030. The structure of the compensator 1000 according to the second embodiment is similar to that of the compensator 100 according to the first embodiment excluding a polarization rotator, an optical power meter, and a tap. The detailed structure of a main controller 1008 shown in FIG. 10 is as shown in FIG. 11, and the main controller 1008 includes an electrical power spectrum comparing unit 1112 and a feedback signal applying unit 1111.

In step 1410, since the polarization scrambler 1020 at the transmission terminal excites all possible polarization states in optical signal with equal probability, the two orthogonal PSPs of the optical signal consistently have the same power.

In step 1420, the transmitted optical signal passes through a polarization controller (PC) 1002 and is input into a polarization beam splitter (PBS) 1004, and the PBS 1004 separates the transmitted optical signal into the two output polarization components such that one component is transmitted to a path 1009 orienting output and the other is transmitted to a path orienting a monitoring path 1005. The component transmitted to the monitoring path 1005 is detected as electrical power spectrum from a photodetector 1006 in step 1430, and the electrical power spectrum passes through a band-pass filter 1007 and the filtered electrical power is input into the main controller 1008. In step 1440, the main controller 1008 determines whether or not the input electrical power spectrum S(f) is converged on a minimum value. In step 1450, the electrical power spectrum comparing unit 712 compares S(f) detected presently with S(f) detected previously. In step 1460, the feedback signal applying unit 1111 applies a feedback signal to the PC 1002 according to the result of comparison such that S(f) converges on the minimum value.

In a case where S(f) is converged on a minimum value by repeating feedback process, the size of a compensated signal output from an output terminal 1009 of the compensator 1000 is always half of the size of the input signal to the PBS 1004, and thus, the polarization rotator 103 shown in FIG. 1 or the first optical power meter 116 and the second optical power meter 109 for comparing the size of two outputs of the PBS 105 or the optical taps 107 and 114 are unnecessary. In addition, the main controller 1008 includes only the electrical power spectrum comparing unit 1112 and the feedback signal applying unit 1111 to make electrical power converge on a minimum value as shown in FIG. 11, and an optical power comparing unit or a rotation command applying unit for controlling a polarization rotator is unnecessary, and thus, the structure of the compensator becomes more simplified.

In FIG. 10, powers of the two PSP components are the same, that is, $θ_o=π/4$, and from this result, the electrical power spectrum S(ω) of Equation 6 is obtained as follows $$S(\omega) = a^2 I_o^2 \qquad (9)$$

$$\left\{\left(\frac{1}{4} - \cos^2\theta\sin^2\theta\sin^2\frac{\omega\tau}{2}\right)|F(\omega)|^2 + \cos^2\theta\sin^2\theta \cdot |H(\omega)|^2\cos^2\omega_o\tau - \right.$$

$$\left. \cos\theta\sin\theta\cos\omega_o\tau \cdot Re[(e^{i\omega\tau}\cos^2\theta + \cos^2\theta)F(\omega)H*(\omega)]\right\}.$$

Figure 12:
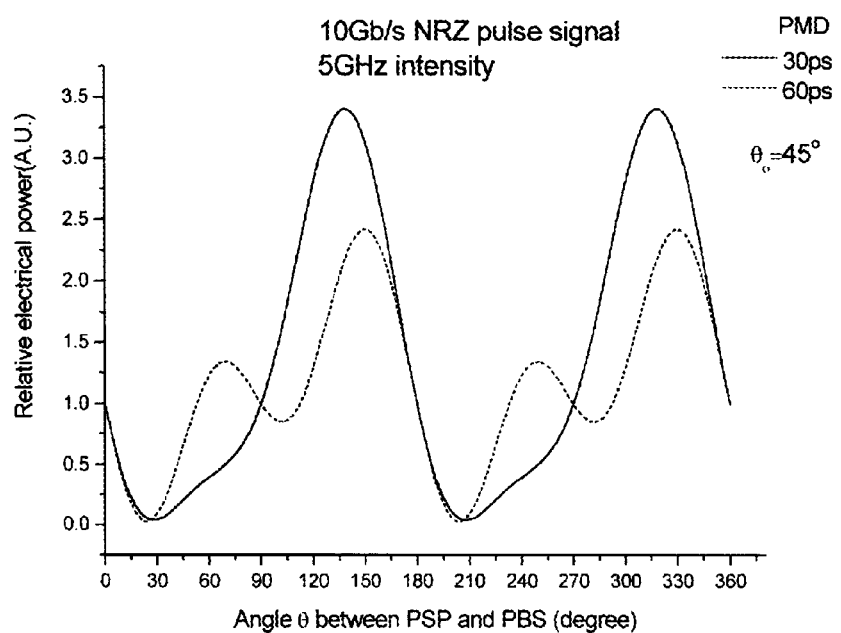
FIG. 12 is a graph illustrating change of relative electrical power at a given 5 GHz frequency with variations in an angle formed between the PBS and the PSP according to the second embodiment of the present invention.
Figure 13:
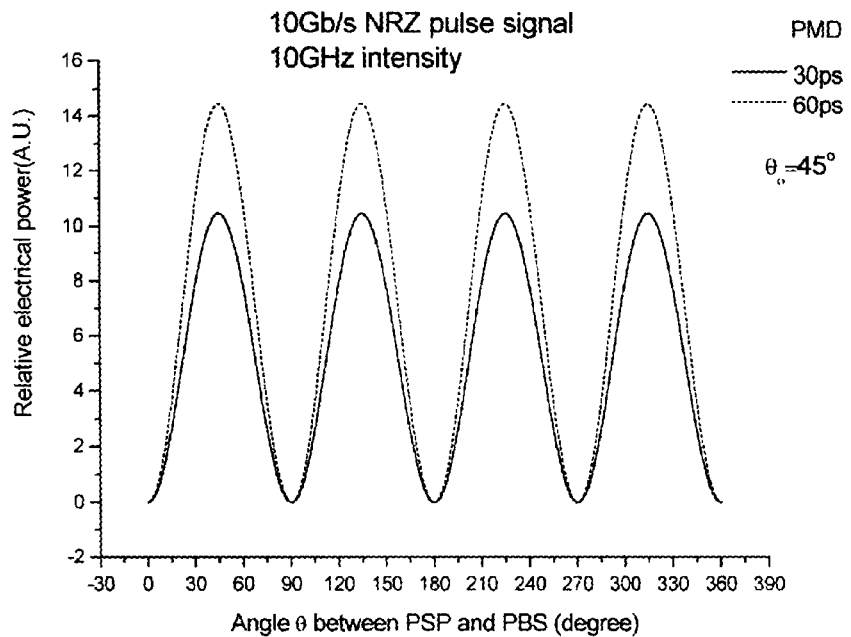
FIG. 13 is a graph illustrating change of relative electrical power at a given 10 GHz frequency with variations in an angle formed between the PBS and the PSP according to the second embodiment of the present invention.
Figure 14:
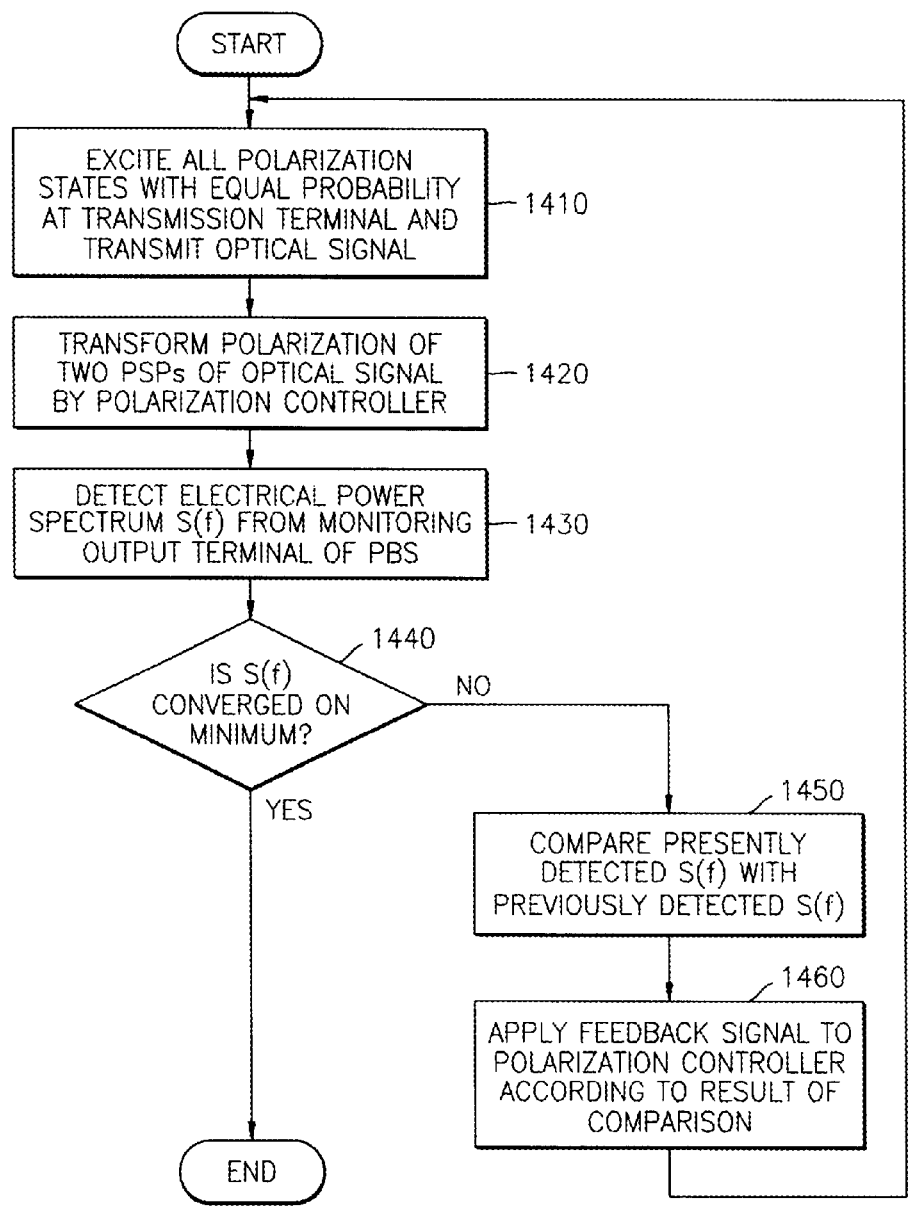
FIG. 14 is a flow chart illustrating step of compensating PMD by using the PMD compensator shown in FIG. 10.
Figure 15:
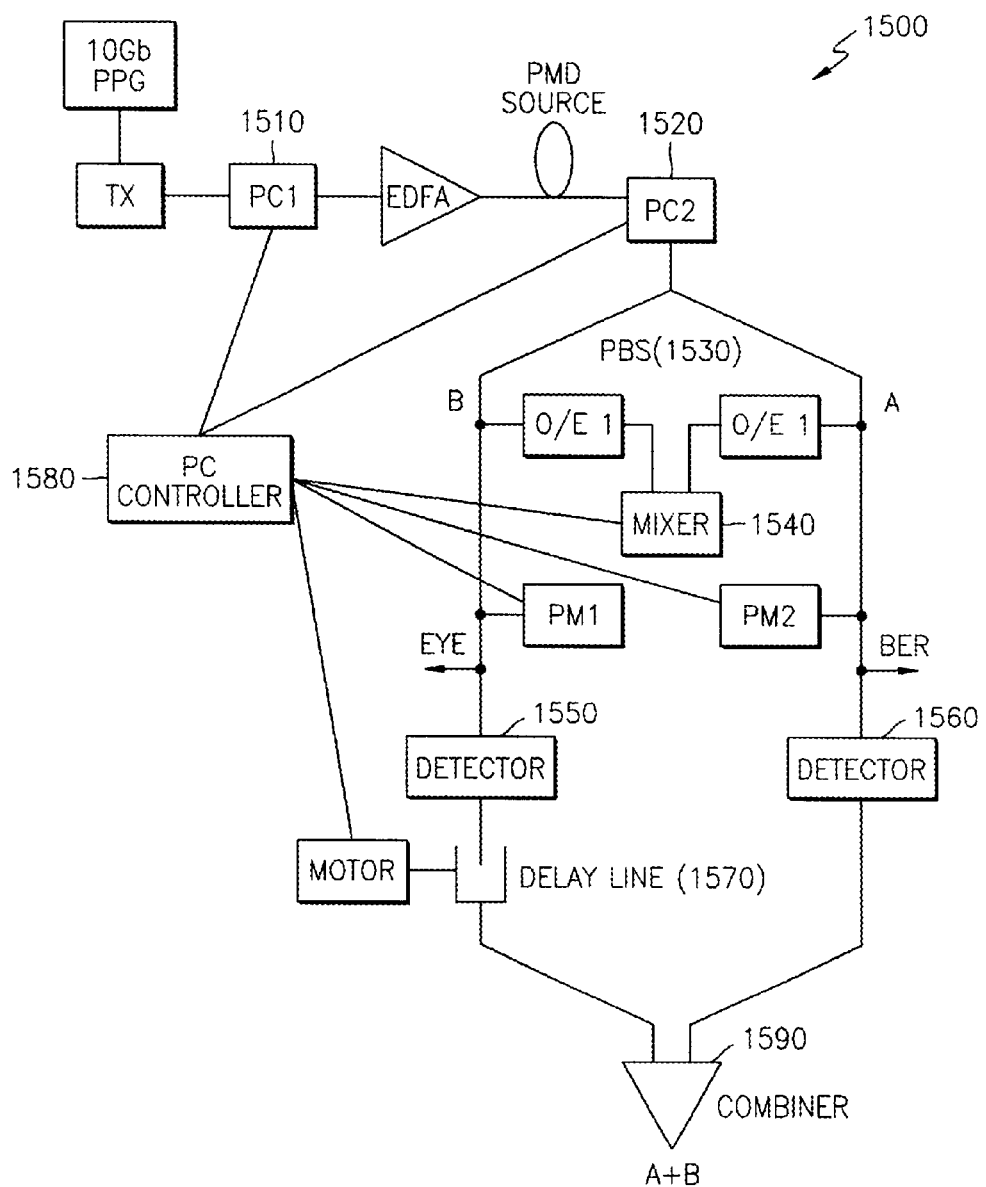
FIG. 15 is a block diagram illustrating the structure of a PMD compensator in the prior art 1.
Figure 16:
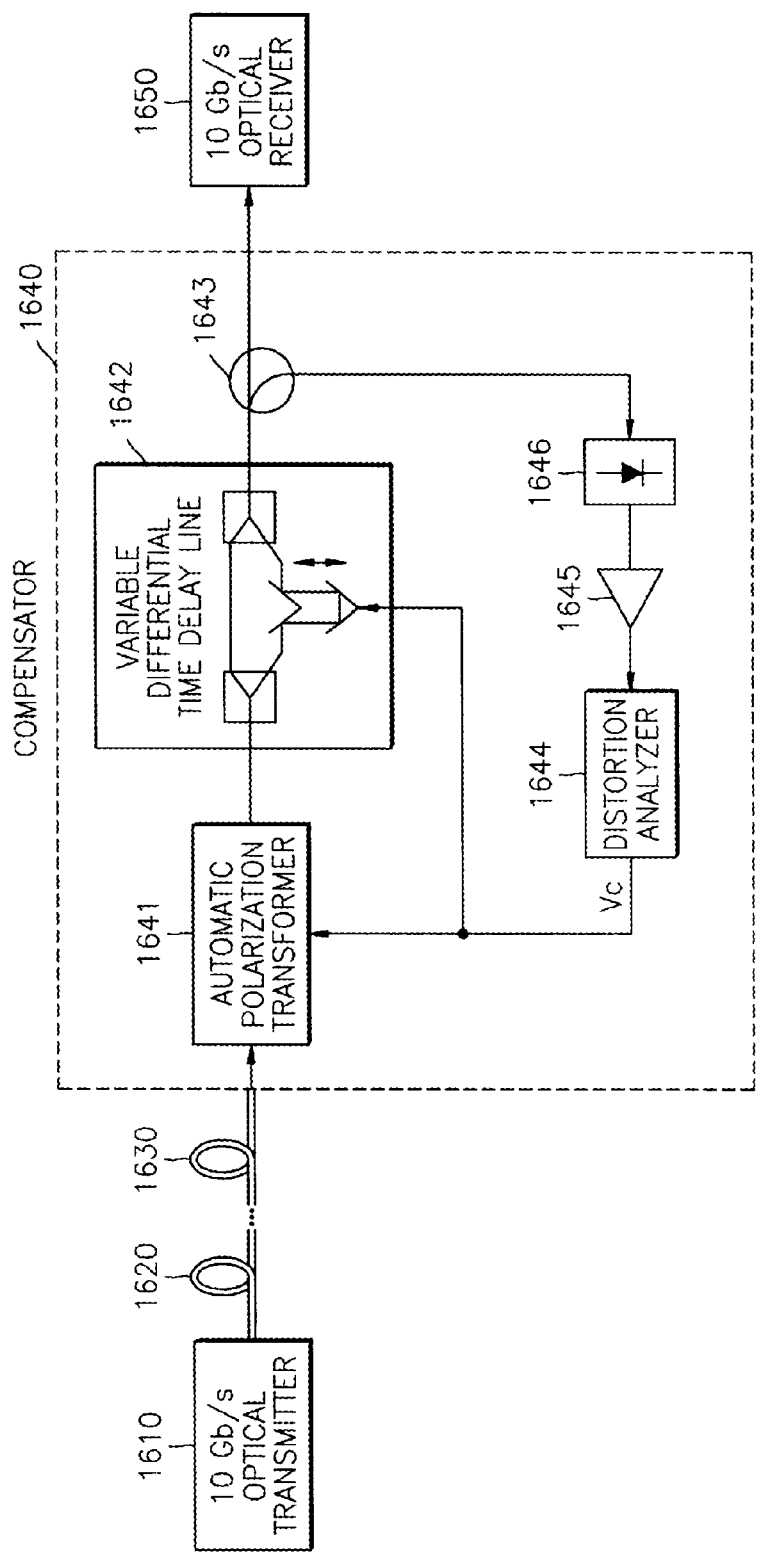
FIG. 16 is a block diagram illustrating the structure of a PMD compensator in the prior art 2.
Figure 17:
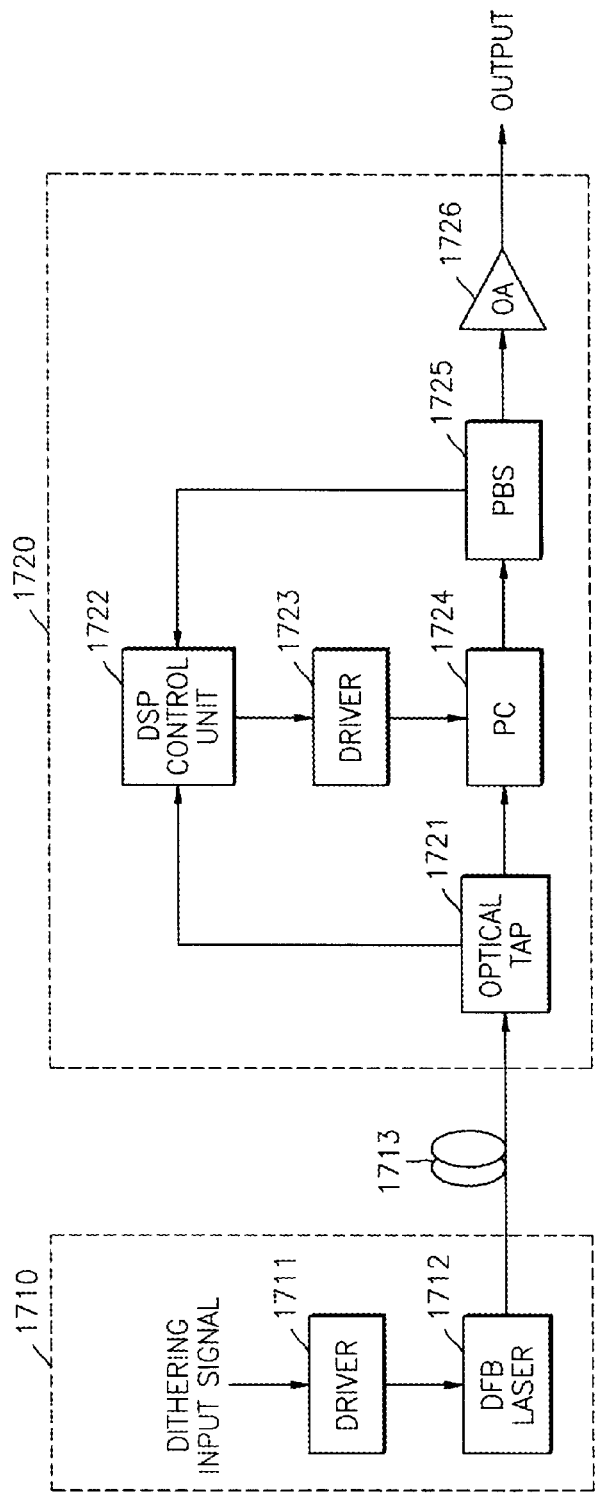
FIG. 17 is a block diagram illustrating the structure of a PMD compensator in the prior art 3.

FIG. 12 shows a graph illustrating variation of S(ω) at the 5 GHz frequency caused by change of θ with PMD values of 30 ps and 60 ps, respectively, for the 10 Gb/s NRZ pulse mode of FIG. 5 that is previously exemplified. Like the previous case, an electrical power does not converge on a maximum or minimum value at any value of θ=nπ/2(n=0, 1,2, . . . ), and thus a compensated signal cannot be tracked. However, it can be observed that the electrical power converges on a minimum value at θ=nπ/2(n=0,1,2, . . . ) at a 10 GHz frequency, as shown in FIG. 13, and thus PSP tracking can be performed. That is, in the structure of the PMD compensator shown in FIG. 10, PSP can be tracked at a frequency of f=n/T(n=1,2,3, . . . ), and since F(ω)=0 at such frequency, the electrical power spectrum S(ω) can be written as $$S(\omega) = \frac{a^2 I_o^2}{4}\sin^2 2\theta \cdot |H(\omega)|^2 \cos^2\omega_o\tau \qquad (10)$$

According to the present invention, the structure of the PMD compensator is simpler than in prior art, and less loss than in prior art occurs, and high-priced high speed electronic elements are not required, and there are no limitations on a PMD compensation range, and by tracking PSPs using a feedback control to minimize an electrical power filtered at the predetermined frequency satisfying the previously mentioned principle and selecting a polarization with larger optical power, the compensated output signal power is always over half of the input signal power to the compensator and has an increased optical signal-to-noise ratio (OSNR) due to reduced amplified spontaneous emission (ASE) noise by the PBS, thereby improving the system performance as well as guaranteeing the reliability of the compensator.

Further, polarization of the input optical signal at the transmission terminal is excited in all directions with equal probability and is transmitted over transmission fiber, thereby a high-speed PMD compensator with simpler optical structure and signal processing can be achieved.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An apparatus for compensating polarization mode dispersion (PMD) occurring in an optical transmission fiber, the apparatus comprising:
    a polarization controller (PC) for transforming states and directions of polarization components of an optical signal received from the optical transmission fiber;
    a polarization rotator for rotating the polarization components of an optical signal output from the PC;
    a polarization beam splitter (PBS) for separating two orthogonal polarization components of an optical signal output from the polarization rotator, for transmitting a first polarization component to a signal output path and transmitting a second polarization component to a monitoring path;
    a compensation controller for controlling the PC using an electrical spectrum of an optical signal transmitted to the monitoring path so that the two orthogonal polarization components of an optical input signal to the PBS are aligned to two axes of the PBS; and
    a rotation controller for controlling the polarization rotator by comparing an optical power of the first polarization component transmitted to the signal output path with an optical power of the second polarization component transmitted to the monitoring path.

2. The apparatus of claim 1, wherein the optical signal transmitted to the monitoring path is detected by a photo-detector to obtain its electrical spectrum.

3. The apparatus of claim 1, wherein the compensation controller comprises:
    a comparing unit for comparing a presently detected electrical power filtered at the predetermined frequency satisfying the previously described principle of operation, with the previously detected one; and
    a feedback signal applying unit for applying a feedback signal to the PC so that the one having a smaller magnitude between the presently detected electrical signal and the previously detected electrical signal is selected as the result of comparison.

4. The apparatus of claim 1, wherein the first polarization component and the second polarization component are measured by a first optical power meter and a second optical power meter, respectively.

5. The apparatus of claim 4, wherein the rotation controller comprises:
    an optical power comparing unit for comparing a first optical power that is measured from the first optical power meter with a second optical power that is measured from the second optical power meter; and
    a rotation command applying unit for applying a 90 degree rotation command to the polarization rotator in a case where the first optical power is smaller than the second optical power as the result of comparison of the optical power comparing unit.

6. The apparatus of claim 1, wherein the polarization rotator includes a faraday rotator.

7. An apparatus for compensating polarization mode dispersion (PMD) occurring in an optical transmission fiber, the apparatus comprising:
    a polarization scrambler installed at a transmission terminal, for exciting polarization of an input light to the optical transmission fiber with equal probability in all directions and transmitting a scrambled light to the optical transmission fiber;
    a polarization controller (PC) for transforming states and directions of polarization components of an optical signal received from the optical transmission fiber;
    a polarization beam splitter (PBS) for separating two orthogonal polarization components of an optical signal output from the PC, for transmitting a first polarization component to a signal output path and transmitting a second polarization component to a monitoring path; and
    a compensation controller for controlling the PC using an electrical spectrum of an optical signal transmitted to the monitoring path so that the two orthogonal polarization components of an optical input signal to the PBS are aligned to two axes of the PBS.

8. The apparatus of claim 7, wherein the optical signal transmitted to the monitoring path is detected by a photo-detector to obtain its electrical spectrum.

9. The apparatus of claim 8, wherein the compensation controller comprises:
    a comparing unit for comparing a presently detected electrical power filtered at the predetermined frequency satisfying the previously described principle of operation, with the previously detected one; and
    a feedback signal applying unit for applying a feedback signal to the PC so that the one having a smaller magnitude between the presently detected electrical signal and the previously detected electrical signal is selected as the result of comparison.

10. A method for compensating polarization mode dispersion (PMD) occurring in an optical transmission fiber, the method comprising:
    (a) transforming states and directions of polarization components of an optical signal received from the optical transmission fiber;
    (b) rotating the polarization components of an optical signal output from a polarization controller (PC);
    (c) separating two orthogonal polarization components of the optical signal output from a polarization rotator so that a first polarization component is transmitted to an signal output path and a second polarization component is transmitted to a monitoring path;
    (d) controlling the PC using an electrical spectrum of an optical signal transmitted to the monitoring path so that the two orthogonal polarization components of an optical input signal to a polarization beam splitter (PBS) are aligned to two axes of the PBS; and
    (e) controlling the polarization rotator by comparing an optical power of the first polarization component transmitted to the signal output path with an optical power of the second polarization component transmitted to the monitoring path.

11. The method of claim 10, wherein step (d) comprises:
    detecting the band-pass filtered electrical power at the predetermined frequency satisfying the previously described principle of operation;
    comparing a presently detected electrical power with the previously detected one; and
    applying a feedback signal to the PC so that the one having a smaller magnitude between the presently detected electrical signal and the previously detected electrical signal is selected as the result of comparison.

12. The method of claim 10, wherein step (e) comprises:

measuring optical powers of the first polarization component and the second polarization component, respectively;

comparing a first optical power of the first polarization component with a second optical power of the second polarization component; and applying a 90 degree rotation command to the polarization rotator in a case where the first optical power is smaller than the second optical power as the result of comparison.

13. A method for compensating polarization mode dispersion (PMD) occurring in optical transmission fiber, the method comprising:

(a) exciting polarization of input light to optical transmission fiber with equal probability in all directions and transmitting the scrambled light to the transmission line;

(b) transforming states and directions of polarization components of an optical signal received from the optical transmission line;

(c) separating two orthogonal polarization components of the optical signal output from the PC so that a first polarization component is transmitted to an signal output path and a second polarization component is transmitted to a monitoring path; and (d) controlling a polarization controller (PC) using the electrical spectrum of the optical signal transmitted to the monitoring path so that the two orthogonal polarization components of the optical input signal to a polarization beam splitter (PBS) aligned to two axes of the PBS.

14. The method of claim 13, wherein step (d) comprises:

detecting the band-pass filtered electrical power at the predetermined frequency satisfying the previously described principle of operation;

comparing a presently detected electrical power with the previously detected one; and applying a feedback signal to the PC so that the one having a smaller magnitude between the presently detected electrical signal and the previously detected electrical signal is selected as the result of comparison.

15. A method for compensating polarization mode dispersion (PMD) occurring in an optical transmission fiber, the method comprising:

(a) transforming states and directions of polarization components of an optical signal received from the optical transmission fiber;

(b) rotating the polarization components of an optical signal output from a polarization controller (PC);

(c) separating two orthogonal polarization components of the optical signal output from a polarization rotator so that a first polarization component is transmitted to an output path and a second polarization component is transmitted to a monitoring path;

(d) detecting band-pass filtered electrical power at a predetermined frequency;

(e) controlling the PC so that the two orthogonal polarization components of an optical input signal to a polarization beam splitter (PBS) are aligned to two axes of the PBS until the detected electrical power is converged on a minimum value; and (f) controlling the polarization rotator so that a polarization component having a larger optical power between the first and second polarization components that are separated by the PBS is output, once the detected electrical power is converged on a minimum value.

16. A method for compensating polarization mode dispersion (PMD) occurring in an optical transmission fiber, the method comprising:

(a) exciting polarization of input light to the optical transmission fiber with equal probability in all directions and transmitting the scrambled light to the optical transmission fiber;

(b) transforming states and directions of polarization components of an optical signal received from the optical transmission fiber;

(c) separating two orthogonal polarization components of the optical signal output from a polarization controller (PC) so that a first polarization component is transmitted to an output path and a second polarization component is transmitted to a monitoring path;

(d) detecting band-pass filtered electrical power at a predetermined frequency; and (e) controlling the PC so that the two orthogonal polarization components of an optical input signal to a polarization beam splitter (PBS) are aligned to two axes of the PBS until the detected electrical power is converged on a minimum value.

17. The apparatus of claim 1, wherein the polarization controller is controlled by a first control signal generated by the compensation controller and the polarization rotator is controlled by a second control signal generated by the rotation controller.

18. The apparatus of claim 1, wherein only the first polarization component is transmitted through the signal output path as an output signal.

19. The apparatus of claim 1, wherein the polarization controller is controlled to minimize an electrical power of a predetermined frequency of the electrical power spectrum of the optical signal transmitted through the monitoring path.

* * * * *